United States Patent
Bruns et al.

(10) Patent No.: US 12,403,926 B2
(45) Date of Patent: Sep. 2, 2025

(54) METHOD FOR BUILDING AN AD HOC VIRTUAL NETWORK AND SYSTEM

(71) Applicant: VOLKSWAGEN AKTIENGESELLSCHAFT, Wolfsburg (DE)

(72) Inventors: Christian Bruns, Braunschweig (DE); Jakob Spiegelberg, Braunschweig (DE); Jan Sonnenberg, Didderse (DE); Bernd Lehmann, Wolfsburg (DE); Laura Fieback, Leipzig (DE); Marius Spika, Braunschweig (DE); Tatjana Kruscha, Braunschweig (DE); Fabian Galetzka, Wolfsburg (DE); Benjamin Groß, Braunschweig (DE); Jan Kempa, Wolfsburg (DE); Christoph König, Hannover (DE); Marvin Schröder, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 342 days.

(21) Appl. No.: 18/343,358

(22) Filed: Jun. 28, 2023

(65) Prior Publication Data
US 2024/0067204 A1   Feb. 29, 2024

(30) Foreign Application Priority Data
Jun. 28, 2022   (DE) ..................... 10 2022 206 506.9

(51) Int. Cl.
*B60W 50/14*   (2020.01)

(52) U.S. Cl.
CPC ....... *B60W 50/14* (2013.01); *B60W 2050/143* (2013.01); *B60W 2554/4049* (2020.02)

(58) Field of Classification Search
CPC ....................................................... B60W 50/14
(Continued)

(56) References Cited

U.S. PATENT DOCUMENTS

| 10,225,690 B2 | 3/2019 | Grotendorst et al. |
| 10,832,577 B2 | 11/2020 | Augst |

(Continued)

FOREIGN PATENT DOCUMENTS

| DE | 102015218964 A1 | 3/2017 |
| DE | 102016002703 A1 | 9/2017 |

(Continued)

OTHER PUBLICATIONS

Office Action; Japanese Patent Application No. 2023-105088; May 7, 2024.

*Primary Examiner* — Qutbuddin Ghulamali
(74) *Attorney, Agent, or Firm* — BARNES & THORNBURG LLP

(57) ABSTRACT

A method for setting up a virtual ad hoc network for transmitting at least one piece of information to a first transportation vehicle as a first network subscriber. The method includes the information being provided based on first data from at least one second network subscriber; and at least one second network subscriber being a second transportation vehicle or an infrastructure component; wherein a motor-vehicle-external, central data processing device receives second data from multiple potential second network subscribers and takes the second data and at least one space-time parameter as a basis for determining the second network subscribers and setting up the virtual ad hoc network with the first transportation vehicle, as the first network subscriber, and the determined second network subscribers, the space-time parameter defining a specific area of relevance that has a predetermined physical and (Continued)

temporal correlation with the current position of the first transportation vehicle.

18 Claims, 2 Drawing Sheets

(58) Field of Classification Search
USPC .......................................................... 455/403
See application file for complete search history.

(56) References Cited

U.S. PATENT DOCUMENTS

| | | |
|---|---|---|
| 11,501,635 B2 | 11/2022 | Kodama |
| 2014/0091949 A1 | 4/2014 | Tickoo et al. |
| 2016/0210853 A1 | 7/2016 | Koravadi |
| 2017/0084175 A1* | 3/2017 | Sedlik .................. H04B 1/3822 |
| 2018/0260485 A1 | 9/2018 | Nakata |
| 2021/0179095 A1* | 6/2021 | Penilla .................. B60W 30/09 |

FOREIGN PATENT DOCUMENTS

| | | |
|---|---|---|
| DE | 102019218382 A1 | 5/2021 |
| JP | 2012083995 A | 4/2012 |
| JP | 2015102893 A | 6/2015 |
| JP | 2016057880 A | 4/2016 |
| JP | 2018101384 A | 6/2018 |
| JP | 2018152053 A | 9/2018 |
| JP | 2019067038 A | 4/2019 |

* cited by examiner

METHOD FOR BUILDING AN AD HOC VIRTUAL NETWORK AND SYSTEM

PRIORITY CLAIM

This patent application claims priority to German Patent Application No. 10 2022 206 506.9, filed 28 Jun. 2022, the disclosure of which is incorporated herein by reference in its entirety.

SUMMARY

Illustrative embodiments relate to a method for setting up a virtual ad hoc network for transmitting at least one piece of information to a first transportation vehicle as a first network subscriber of the virtual ad hoc network, the information being provided on the basis of first data provided by at least one second network subscriber, the at least one second network subscriber being a second transportation vehicle or an infrastructure component.

BRIEF DESCRIPTION OF THE DRAWINGS

Exemplary embodiments are described below with respect to the drawing, in which.

DETAILED DESCRIPTION

Figure 1:
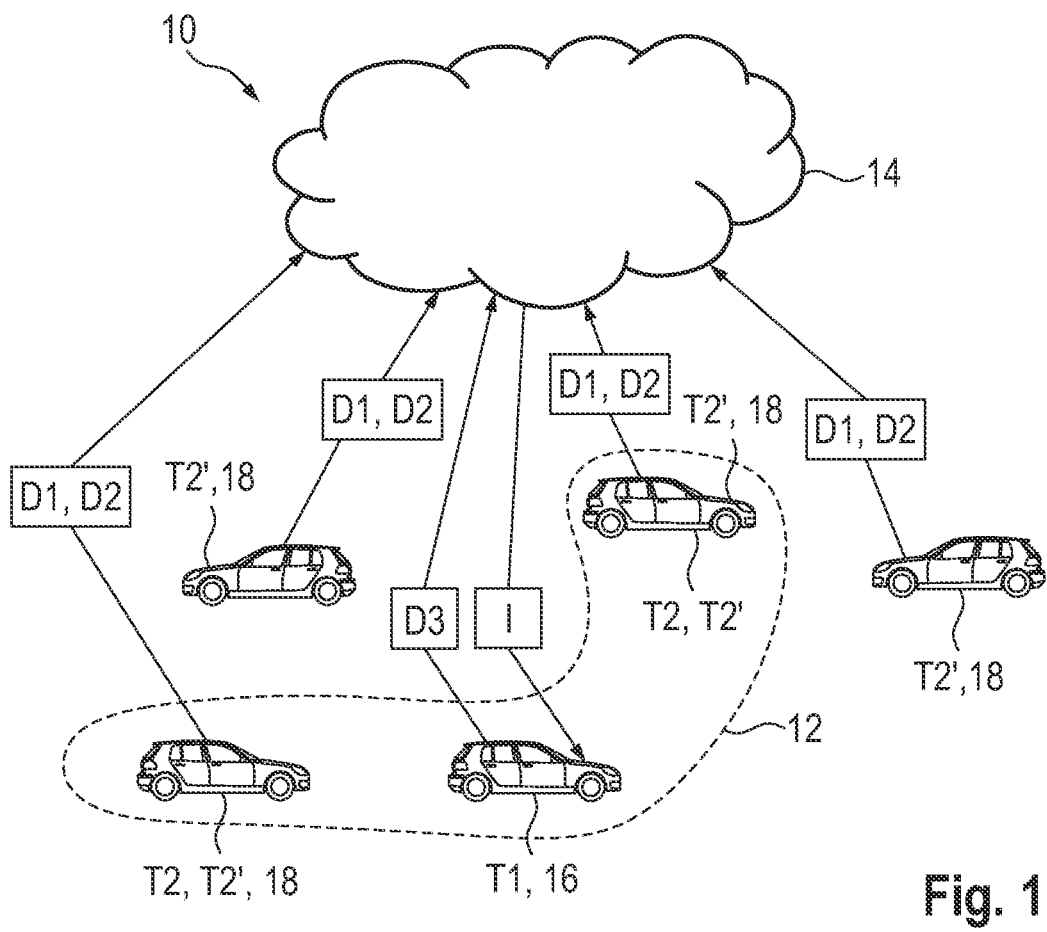
FIG. 1 shows a schematic representation of a system for setting up a virtual ad hoc network according to an exemplary embodiment.

The prior art discloses various options for transmitting information provided by transportation vehicles or infrastructure components to other transportation vehicles or infrastructure components. This can be accomplished using car-to-X communication, for example. The respective transportation vehicles or infrastructure components in this case typically each have an appropriate car-to-X communication module by which they can communicate among one another. This allows a transportation vehicle to specifically request information from a further transportation vehicle or an infrastructure component, for example. The range of this car-to-X communication is locally limited, which is often not a drawback, however, since usually only the information from the immediate surroundings of a transportation vehicle in question is relevant to the transportation vehicle. Furthermore, there are also options for the provision of information by a central data processing device, for example, an Internet server. This central data processing device can collect data from transportation vehicles or else infrastructure components and forward them to other transportation vehicles. This is typically done by a broadcast. This therefore produces a very high level of data traffic. The range in this case is theoretically unlimited, however.

In principle, such systems always encounter the problem that transportation vehicles are often sent data and information that are not relevant to the transportation vehicles in question, however. Options for filtering such data as appropriate are therefore also known from the prior art.

By way of example, U.S. Pat. No. 10,225,690 B2 describes a method for filtering a message that has been transmitted between a transmitter and a receiver in a transportation vehicle ad hoc network. The message in this case comprises the position of the transmitter. The message is rejected here if a distance between the position of the transmitter and the position of the receiver exceeds a specific limit value.

Although this can sometimes prevent a message that may not be relevant to the transportation vehicle in question from being logged and evaluated by this transportation vehicle, the message is nevertheless sent by the transmitter. The unnecessary data traffic thus cannot be reduced, at least at the transmitter, in this way.

Furthermore, US 2017/0084175 A1 describes cloud-based transportation vehicle message exchange for local transit events. A transit service can be used to combine transportation vehicles into a group on the basis of their position, in particular, in regard to a location at which a transit event has taken place. The vehicles in this group can then be informed about this transit event.

Furthermore, US 2021/0179095 A1 describes a system for processing communication with connected objects. The processing by the system uses a processor of the transportation vehicle and the processing and the data of one or more servers of a cloud system. The connected objects comprise objects that have a communication option that is either permanently situated at a specific position as infrastructure close to the transportation vehicle or at locations in proximity to the moving transportation vehicle. A zone of influence can be defined around a transportation vehicle in question in this case, with the result that only connected objects within this zone of influence can interchange data with the transportation vehicle in question. The zone of influence defines in this case a physical area around the transportation vehicle, which can also change depending on the situation.

US 2016/0210853 A1 describes a vehicle visual system with traffic observation and warning. When a transportation vehicle detects congestion by sensor, it can transmit an appropriate warning message to a remote system.

Although physically restricting the transmission of information, in particular, also at the transmitter, allows the data traffic to be reduced, this still does not provide for particularly good adaptation to situations.

DE 10 2019 218 382 A1 describes a method for a database of a traffic system, wherein a sensor dataset indicative of a temporary state is received from one road user from the multiplicity of road users, and the temporary state is determined from the sensor dataset to inform at least one road user from the multiplicity of road users.

DE 10 2015 218 964 A1 describes a method for ascertaining road users with a potential for interaction, wherein a unit logs useful information in regard to a multiplicity of road users entering an entrance to a route section and wherein service data are ascertained on the basis of the useful information.

DE 10 2016 002 703 B4 describes a method for communication between a first transportation vehicle and a second transportation vehicle under the mediation of a server.

The disclosed embodiments provide a method and a system that permit the most comprehensive possible provision of only relevant information to a transportation vehicle in a manner that is as appropriate to situations as possible.

This is achieved by the disclosed method and the disclosed system.

A disclosed method for setting up a virtual ad hoc network for transmitting at least one piece of information to a first transportation vehicle as a first network subscriber of the virtual ad hoc network involves the information being provided on the basis of first data provided by at least one second network subscriber, the at least one second network subscriber being a second transportation vehicle or an infrastructure component. In this case, a motor-vehicle-external, central data processing device receives second data from multiple potential second network subscribers and takes the second data and at least one space-time parameter, ascertained on the basis of a current position of the first transportation vehicle, as a basis for determining the second network subscribers and sets up the virtual ad hoc network with the first transportation vehicle, as the first network subscriber, and the determined second network subscribers, the space-time parameter defining a specific area of relevance that has a predetermined physical and temporal correlation with the current position of the first transportation vehicle. As soon as a potential second network subscriber is selected as a second network subscriber, the selected second network subscriber increases a resolution and/or a capture rate for capture of the first data and/or a provision rate for provision of the first data at the central data processing device or for provision of the information at the first transportation vehicle.

The disclosed embodiments are based here on multiple insights: first, the incorporation of a central data processing device, for example, an Internet server, or cloud server, or else a system comprising multiple Internet servers, which may be part of a cloud, facilitates the collection and use of significantly larger volumes of data than would be possible using pure car-to-X communication, for example. Above all, however, information can be provided in a manner that is much more appropriate to situations, and, in particular, individually for a respective first transportation vehicle, by a central data processing device of this kind. The central data processing device can therefore act as a superordinate entity allowing those data that are relevant to a specific first transportation vehicle to be filtered out from numerous captured or received data and used. This is accomplished by setting up a virtual ad hoc network, as described above. For this purpose, the central data processing device groups those network subscribers that are situated within a common physically and temporally correlated area of relevance defined in regard to the current position of the first transportation vehicle. The special feature in this instance is primarily that a temporal component is also taken into consideration in this instance. In other words, it is not simply a case of those potential second network subscribers that are situated close to the first transportation vehicle according to a predetermined criterion being determined as second network subscribers, but rather it is also possible to take into consideration network subscribers that will not be situated at the current location of the first transportation vehicle until a later time or that have been at this location in the past. This allows much more comprehensive information about the current location of the first transportation vehicle to be provided to the transportation vehicle. The disclosed embodiments facilitate the formation of a spontaneous information network, such as the virtual ad hoc network, on the basis of the current situation by including cloud-based information or cloud-based knowledge, and also including physically and temporally remote subscribers according to need. Two of the network subscribers can therefore be combined with the first transportation vehicle to form a virtual ad hoc network, specifically according to an informative relationship that goes far beyond a purely physical correlation between the network subscribers and hence facilitates much better adaptation for situations.

The term "virtual ad hoc network" is intended to express that at least an indirect exchange of information or data transfer is possible among the network subscribers and, in particular, the network subscribers can be combined and also disbanded again spontaneously or instantaneously. An ad hoc network of this kind is not meant to be regarded as an actual ad hoc network, which can be understood to mean a radio network in which the radio nodes are connected as a meshed network. It is not necessary for direct communication between the network subscribers of the virtual ad hoc network that has been set up to also be possible in the present case. In particular, it is conceivable for the network subscribers to transmit data only to the central data processing device, for the latter to forward the data as the information or to infer the information from these data and to send it to the transportation vehicle in question, which is referred to as the first transportation vehicle in the present case. There is also no managing infrastructure in ad hoc networks, which likewise does not have to be the case with the virtual ad hoc network here. In particular, the central data processing device performs a superordinate and therefore also managing function. The setup of the virtual ad hoc network can be understood as grouping of network subscribers according to predetermined criteria by the central data processing device, so to speak. These network subscribers that are in a common group can use their respectively provided data among one another. Precisely which data are used or to which of the network subscribers they are forwarded or for which of the network subscribers they are evaluated in this case can be decided by the central data processing device itself, on the other hand, as will be explained in more detail later. This affords a much greater level of adaptation for the situation. Both the sending and receiving of unnecessary information can be reduced to a minimum as a result, and the likelihood of relevant data being ignored can also be reduced. The communication with the central data processing device may be radio-based. This can be accomplished using a WLAN or mobile radio standard. The communication range is, therefore, not restricted. Each first, second and potential second network subscriber can also have an associated communication module by which the subscriber in question can communicate with the central data processing device and/or the other subscribers. Optional direct communication among network subscribers can optionally use a different communication standard or different type of communication, e.g., car-to-X communication, than the communication with the central data processing device.

The updating of the second network subscribers can be carried out by the central data processing device in successive time operations. In other words, the data processing device can repeatedly check whether the selected network subscribers are still situated in the physically and temporally correlated area of relevance. Furthermore, each network subscriber may be not only part of a single virtual ad hoc network but also, in particular, at the same time, part of multiple different virtual ad hoc networks that are each formed by different subscriber groups.

In one exemplary embodiment, the central data processing device determines the second network subscribers on the basis of at least one first situation parameter associated with the first transportation vehicle, which situation parameter characterizes a traffic situation that the first transportation vehicle is in, the situation parameter being selected from multiple defined situation parameters on the basis of third data received from the first transportation vehicle by the data processing device. Thus, it is therefore possible for the third data to be taken as a basis for the data processing device to determine the current traffic situation that the first transportation vehicle is currently in. Taking account of such a situation parameter is very beneficial, since it permits only situation-relevant information to be transmitted to the first transportation vehicle. It is therefore possible for the network subscribers to be selected or determined not only on the basis of the aforementioned space-time parameter but also additionally on the basis of such a situation parameter. Thus, it may therefore be that although a specific potential second network subscriber is in direct physical and temporal proximity to the first transportation vehicle, it is still not selected as a second network subscriber because it cannot provide any relevant information for the current traffic situation that the first transportation vehicle is currently in. This can be established, e.g., on the basis of the second data. A situation-dependent selection of the network subscribers is therefore provided.

This also facilitates many beneficial configurations, some of which will be mentioned as examples below:

- Warning when alighting: two transportation vehicles are in a street. The rear transportation vehicle warns a transportation vehicle that is stationary further ahead that a cyclist is approaching and the driver's alighting process needs to be briefly delayed. In this example, the front transportation vehicle is thus the first transportation vehicle and the rear transportation vehicle is a second network subscriber. The rear transportation vehicle detects the cyclist, this corresponding to the first data. The warning transmitted to the front transportation vehicle regarding the cyclist accordingly corresponds to the information. The information can then also be output in an appropriate manner as a warning to the driver. If, for example, another transportation vehicle parks in front of the front transportation vehicle, then this further transportation vehicle is also in direct proximity to the first transportation vehicle. Since this further parking transportation vehicle cannot detect the cyclist approaching from behind, however, this further transportation vehicle is totally irrelevant to the current traffic situation that the first transportation vehicle is currently in. This further parking transportation vehicle is therefore not selected as a second network subscriber despite being in direct proximity to the first transportation vehicle, even though it would be a suitable candidate based on the space-time parameter. Owing to the additionally provided situation parameter that characterizes this park and alight situation, an additional selection criterion for the network subscribers can be provided, according to which this front, likewise parking transportation vehicle is therefore not selected as a network subscriber.

- Quick crossing: transportation vehicles at junctions exchange ideas about their planned journeys. The person in front could signal to the person behind to go and that they have a view of the junction. The rear transportation vehicle could follow directly and without delay if the person in front sees a clear junction. The person in front is therefore a second network subscriber, and the person behind, or the rear transportation vehicle, is the first transportation vehicle. In this case, the situation parameter characterizes a junction situation for the first transportation vehicle. A further, subsequent transportation vehicle without a view of the junction would not be relevant here either, despite physical and temporal proximity, and can accordingly be rejected as a second network subscriber on the basis of the situation parameter.

- Blind spot: the blind spot of a transportation vehicle traveling in front could be "illuminated" by a transportation vehicle traveling further behind. The transportation vehicle traveling further behind thus corresponds to a second network subscriber; the transportation vehicle traveling in front corresponds to the first transportation vehicle. In this example, the situation parameter characterizes this blind spot situation. Transportation vehicles or infrastructure components that cannot see this blind spot area are likewise not selected as second network subscribers on the basis of the situation parameter. However, such potential network subscribers that, although they cannot currently see the blind spot area, will probably be able to in the near future, e.g., because they are being overtaken by the first transportation vehicle, could likewise be selected as second network subscribers here. This can again be taken into account by the space-time parameter in combination with the situation parameter.

- Help when crossing: assistance in crossing a junction through situation-dependent proposals for stopping and continuing, based on the total information from the transportation vehicles and/or sensors that are at the junction. All of the transportation vehicles and/or sensors at the junction can therefore be network subscribers of the virtual ad hoc network that has been set up. At the same time, all of the transportation vehicles at the junction can also be first transportation vehicles. These are not all provided with the same information, however; rather, an individual proposal for stopping or continuing can be made for a respective transportation vehicle.

- Special, upcoming situations: in this case, the driver of the first transportation vehicle can be provided with advice of upcoming events in the future, for example, of traffic lights, yield rules and so on, for example, such as, "Caution: you are turning left. Pay particular attention to . . . ".

In contrast to car-to-car communication or car-to-X communication, this approach does not involve all information being distributed locally in the same way, but rather only the specifically required information between the relevant subscribers. The relevance can result from current physical and/or temporal proximity or can result on the basis of further criteria that predict, for example, "will be there at a suitable time afterwards", the behavior of the other road users, e.g., "broken-down vehicle in my lane", or the like. These additional criteria can be represented by the situation parameter. A wide variety of traffic situations that the first transportation vehicle may theoretically be in can be defined beforehand. Any situation can be characterized by an appropriate situation parameter. For any situation or any situation parameter, there may additionally also be a further criterion stored, according to which network subscribers are then meant to be selected on the basis of the respective situation parameter as appropriate. Among the blind spot situations described above, only such potential second network subscribers that are currently behind the first transportation vehicle in the direction of travel, or possibly also will be in the near future, and/or that have appropriate environment sensors for detecting other road users by sensor are then relevant to the first transportation vehicle, for example. The situation parameters allow many different traffic situations to be defined or characterized, for example, traveling on a road, traveling through the junction, boarding, alighting, and so on. Situations can also arise spontaneously, for example, as a result of an accident. Such an accident situation can also be characterized by an appropriate situation parameter.

On the basis of the third data, it is possible to ascertain the traffic situation that the first transportation vehicle is currently in. The third data will be explained in more detail later and can be, e.g., sensor data of the first transportation vehicle, and can also include position data indicating the current position of the first transportation vehicle. These sensor data may have been captured by sensors of the first transportation vehicle, in particular, environment sensors. The use of environment data is very beneficial in this case to be able to describe the current traffic situation of the first transportation vehicle. However, other parameters, in particular, vehicle parameters, can also be taken into consideration in this case, for example, the current velocity or the current operating state of the transportation vehicle, the activation state of specific components of the transportation vehicle, or the like.

In a further exemplary embodiment, the information is ascertained from the first data individually for the first transportation vehicle on the basis of the situation parameter and is transmitted only to the first transportation vehicle within the virtual ad hoc network. As already mentioned above, it is possible to transmit individual information to respective first transportation vehicles, depending on their current traffic situation. The current traffic situation can in turn be defined on the basis of the third data. The information to be transmitted to the first transportation vehicle is thus not simply shared among all network subscribers as a broadcast, but rather in this case is directed specifically to the first transportation vehicle and is appropriate to the specific current traffic situation thereof. Nevertheless, it is still additionally conceivable to also transmit information as a broadcast to multiple instances of the network subscribers in certain situations, for example, when warning about an accident.

In a further exemplary embodiment, the central data processing device ascertains the information on the basis of the first data and, in particular, on the basis of the situation parameter and transmits the information to the first transportation vehicle. In other words, the information is sent from the central data processing device directly to the first transportation vehicle. The information is thus not transmitted via a second network subscriber. This has the great benefit that the central data processing device can first filter, evaluate and otherwise further-process the data received from the second network subscriber, for example, to thus extract only the information that is relevant to the first transportation vehicle and the current traffic situation of the first transportation vehicle that is specified by the situation parameter. Additionally, the first data transmitted to the central data processing device can be taken as a basis for carrying out further calculations, to derive specific information therefrom that is transmitted to the first transportation vehicle as the information. In other words, the data provided by the second network subscribers do not need to be transmitted to the first transportation vehicle as the information without alteration, which is theoretically likewise conceivable, but rather appropriate information is derived from these data and transmitted to the first transportation vehicle. As a result, the volumes of data to be transmitted can likewise be reduced and, in particular, filtering with regard to relevance can again be carried out by the central data processing device. Moreover, processing and calculation operations can be performed by the central data processing device, which is significantly easier, more efficient and faster than if, for example, the data are simply transmitted directly from the second network subscribers to the first transportation vehicle, and the transportation vehicle then itself first needs to perform appropriate evaluation or analysis.

Nevertheless, according to a further exemplary embodiment, there can be provision for the information to be transmitted to the first transportation vehicle by one of the second network subscribers. In other words, as soon as a second network subscriber such as this has been combined with the first transportation vehicle in a common virtual ad hoc network by the central data processing device, this second network subscriber can also transmit information to the first transportation vehicle directly. Interposition of the central data processing device is thus not necessary. This is beneficial, in particular, when the network subscribers are also in physical and temporal proximity to one another.

In this case, however, the setup of the virtual ad hoc network by the central data processing device determines which of the potential second network subscribers are permitted to transmit data or information to the first transportation vehicle. The second network subscribers are thus filtered in respect of the space-time parameter and additionally on the basis of the optional situation parameter, with the result that this also means that the probability of the information transmitted to the first transportation vehicle also being relevant to the transportation vehicle is high, in particular, in respect of the current traffic situation that the first transportation vehicle is currently in.

According to a further exemplary embodiment, the space-time parameter is stipulated on the basis of the at least one situation parameter. By way of example, it may be that a set of traffic lights at a very great distance, for example, at a distance of 500 meters, should be included as a second network subscriber in the virtual ad hoc network that is to be set up, for example, if the road has no exits, for example, in the case of a freeway. In traffic situations such as these that can be characterized by the situation parameter, the physical and temporal area of relevance can be chosen to be correspondingly larger than in other situations. It is therefore also possible for the physical and temporal area of relevance to thus be provided in a manner particularly appropriate to the situation, and accordingly for the network subscribers to in turn be selected in a manner particularly appropriate to the situation.

According to a further exemplary embodiment, the space-time parameter defines a maximum permitted physical and temporal distance with reference to the current position of the first transportation vehicle, wherein only those of the potential second network subscribers that are within the maximum permitted physical and temporal distance with reference to the current position of the first transportation vehicle are selected as second network subscribers by the central data processing device, in particular, wherein potential second network subscribers that are at a greater distance from the current position of the first transportation vehicle than the maximum permitted physical distance at a first time, but are, or, based on a prediction, have a predeterminately high probability of being, within the maximum permitted physical distance at a second time, which is within the maximum permitted temporal distance at the first time, can be selected, or are selected, as second network subscribers, even if the first transportation vehicle is then no longer there, i.e., at its original position corresponding to the first time. That is to say that if, for example, the physical and temporal distance is chosen to be very small, only potential second network subscribers that are at a very short physical distance from the first transportation vehicle within a period of time chosen to be very short around the current time are actually possible second network subscribers. If only the temporal distance is chosen to be very large, then only potential second network subscribers that in the past, currently or at a time in the future have been/are/will be in an area that was very close to the current position of the first transportation vehicle are possible second network subscribers. These network subscribers thus do not necessarily need to be very close to the transportation vehicle currently, but rather may also not be at the current location of the first transportation vehicle for a few minutes, hours or weeks, or may also have been at this location a few minutes, hours or weeks ago, depending on the choice of the temporal distance. This period of time, be it milliseconds, seconds, minutes, hours, weeks or even longer, is defined by the space-time parameter. It may thus be that the network is also formed using subscribers that are currently not at all physically close to it, but rather will not be there for some time. This is beneficial, for example, if information about a specific location is supposed to be collected, for example, regarding the surface condition of the roadway. As such, for example, a first transportation vehicle can be warned if it is traveling towards a pothole. Further collection of the data relating to this location in the past or in the future allows the presence of this pothole to be validated by repeatedly captured data from further transportation vehicles. A repair to the pothole can also be logged in this way and in turn communicated as appropriate information to transportation vehicles that are currently at this position. Conversely, a very large physical and small temporal distance means that the network subscribers in question and the first transportation vehicle are in a relatively large area as simultaneously as possible. A very large physical and temporal distance means that the network subscribers are, have been or will be in a relatively large area around the first transportation vehicle now or in the past or in the future. This provides a very large number of options for adaptation for a current situation.

According to a further exemplary embodiment, the second data comprise a current position of the respective potential second network subscribers, and, in particular, motion data of the respective potential second network subscribers, on the basis of which a future location of the respective potential second network subscriber is forecast. This permits a check to be performed to determine whether these potential second network subscribers are within the area of relevance that has a temporal and physical correlation with the current position of the first transportation vehicle. Possible motion data are a wide variety of data, for example, odometric data, i.e., velocity, acceleration, change of acceleration, steering angle, change of steering angle, etc., of the transportation vehicles in question, navigation data or the like. Tracking of the current position and extrapolation based thereon are also possible. Map data and road data can also be taken into consideration to be able to use the current motion data of the transportation vehicles to predict a location that is likely in the future. If, for example, a transportation vehicle is traveling on a road or a freeway without any turn-off option, the location of the transportation vehicle can be predicted with a high degree of probability for a time a long way into the future. The check to determine whether or not a specific potential second network subscriber is within a defined area of relevance that has a physical and temporal correlation with the current position of the first transportation vehicle can also comprise whether the potential second network subscriber in question has a predeterminately high probability of being within this area of relevance. It is therefore possible that the transportation vehicles that are currently not yet in situ, in particular, based on the position of the first transportation vehicle, but whose prediction states that they will be, can be regarded, or selected, as second network subscribers. The first and third data can also generally comprise position data of the subscribers or potential subscribers from which they are provided.

According to a further exemplary embodiment, the first and/or second and/or third data comprise sensor data that have been captured by at least one sensor, in particular, surroundings sensor, of the at least one second network subscriber or of the potential second network subscribers or of the first transportation vehicle. This is particularly beneficial because sensor data, in particular, relating to the surroundings of the respective network subscribers, now comprise a lot of useful information that may be relevant to other transportation vehicles too. Transportation vehicles today also consist of very many sensors that capture data for driving functions and more. Further sensors are often also found in the infrastructure, at traffic lights, on traffic counters, in car parks, and so on. All of these recorded data can now be used to provide the information to the first transportation vehicle.

According to a further exemplary embodiment, the first and/or second and/or third data comprise personal data of a user or driver of the at least one second network subscriber or of the potential second network subscribers or of the first transportation vehicle. This relates to data from network subscribers or potential network subscribers, which are transportation vehicles and not infrastructure components. Personal data such as these can be, for example, age, sex, driving qualification, for example, learner driver, or the like. It is therefore possible for further background knowledge, in particular, including person-related background knowledge, such as, for example, the capabilities of the driver or drivers of the transportation vehicles, to also be taken into consideration when producing the information that needs to be transmitted to the first transportation vehicle. This information can very easily be combined in a cloud that is provided by the central data processing device or to which the central data processing device can be at least communicatively coupled or of which it can be part, to access these data. In contrast to car-to-X, information is thus also not evaluated locally in the transportation vehicle, but rather in the cloud, in particular, in the central data processing device, in the present case, which thus allows as large a volume of further information as possible to be processed together. Applications can therefore also take the capabilities of the people into account and adapt their recommendations. In other words, the recommendation transmitted to the first transportation vehicle by the information can be adapted for the driver of the first transportation vehicle, for example, generally for older people, learner drivers, tourists, local residents and so on. This permits even better adaptation for the situation.

In at least one exemplary embodiment, the first and/or second and/or third data comprise vehicle parameters of the at least one second network subscriber or of at least one of the potential second network subscribers or of the first transportation vehicle. Vehicle parameters such as these are current values of vehicle parameters that can change quickly over time, such as current velocity, current steering angle, current operating state, e.g., engine and ignition currently switched on or switched off, and also values of vehicle parameters or vehicle properties that cannot change or that can change only very slowly, for example, maneuverability of the transportation vehicle, minimum turning radius, maximum achievable velocity, performance, vehicle type, state of health of the relevant transportation vehicle, and so on. As such, actions adapted for the capabilities and properties of transportation vehicles can also be output as the information, for example, adapted for the possible acceleration behavior of the transportation vehicles, and so on. As such, a recommendation to overtake or not overtake another road user can be transmitted to the first transportation vehicle as the information, depending on the acceleration capability of the first transportation vehicle.

According to a further exemplary embodiment, the first and/or second and/or third data comprise a level of autonomy or a current driving mode of the at least one second network subscriber or of at least one of the potential second network subscribers or of the first transportation vehicle. This also allows consideration to be given to whether a driver is driving the first transportation vehicle themselves or the first transportation vehicle is driving autonomously. It is thus conceivable for self-steering transportation vehicles to be treated differently than, for example, automatically driving transportation vehicles. In other words, different driving advice or behavior recommendations can be output to self-steering transportation vehicles than to automatically driving transportation vehicles. An autonomously driving transportation vehicle has, e.g., a much faster reaction time than a manual driver, which can be taken into consideration in the applicable driving recommendation as the information. The subscribers of a network can therefore be "treated" according to further properties.

According to the disclosed embodiments, there is provision that, as soon as a potential second network subscriber is selected as a second network subscriber, the selected second network subscriber increases a resolution and/or a capture rate for capture of the first data and/or a provision rate for provision of the first data at the central data processing device or for provision of the information at the first transportation vehicle, in particular, depending on the situation parameter. In other words, the information density of the information provided by the second network subscribers can be specifically increased as soon as the network subscribers are selected as such second network subscribers. In the case of the aforementioned blind spot scenario, it is conceivable, for example, that, as soon as a second network subscriber is selected to illuminate this blind spot, the network subscriber uses its environment sensors to specifically capture the area of this blind spot in regard to the first transportation vehicle at a higher resolution or a higher capture rate, and that accordingly the information about this blind spot that is ultimately provided at the first transportation vehicle has a very high information density, or the information provided at the first transportation vehicle has very high reliability as regards the presence of other road users in the blind spot, which is due to the high information density of the information provided by the second network subscriber in this blind spot area. While network subscribers are not participating in a specific virtual ad hoc network, the information provided by the potential network subscribers can therefore be captured at lower resolution or with lower frequency to reduce the volumes of data that need to be transmitted. Only when the information provided by the subscribers in question has been classified as particularly relevant to a situation, in particular, by the central data processing device, is the information able to be provided at an appropriately higher information density by network subscribers in question when they have then ultimately been selected as subscribers to a specific virtual ad hoc network.

According to a further exemplary embodiment, the information comprises a warning or information to a driver of the first transportation vehicle and/or information to the first transportation vehicle, e.g., driver is looking in a different direction or vehicle has excessive length, etc., and/or a driving instruction or behavior instruction to the driver of the first transportation vehicle and/or a function trigger for a function of the first transportation vehicle and/or surroundings information, in particular, about objects situated in the surroundings of the first transportation vehicle. This is incidentally not an exhaustive list. The information can, for example, also comprise navigation instructions, information about a switching state of a set of traffic lights or the like. It is therefore possible for a driver or, generally, a first transportation vehicle to be provided with comprehensive and above all individual and particularly relevant information.

In addition, the disclosed embodiments also relate to a system having a central data processing device for setting up a virtual ad hoc network for transmitting at least one piece of information to a first transportation vehicle as a first network subscriber of the virtual ad hoc network, the central data processing device being designed to provide the information on the basis of first data provided by at least one second network subscriber, the at least one second network subscriber being a second transportation vehicle or an infrastructure component. In addition, the central data processing device is designed to receive second data from multiple potential second network subscribers and to take the second data and at least one space-time parameter, ascertained on the basis of a current position of the first transportation vehicle, as a basis for determining the second network subscribers and to set up the virtual ad hoc network with the first transportation vehicle, as the first network subscriber, and the determined second network subscribers, the space-time parameter defining a specific area of relevance that has a predetermined physical and temporal correlation with the current position of the first transportation vehicle. This system involves a potential second network subscriber being designed so as, as soon as it is selected as a second network subscriber, to increase a resolution and/or a capture rate for capture of the first data and/or a provision rate for provision of the first data at the central data processing device or for provision of the information at the first transportation vehicle.

The benefits of the disclosed method and the configurations of the disclosed method apply to the disclosed system in the same way. The central data processing device is designed to perform the disclosed method or one of the exemplary embodiments of the disclosed method.

For applications or application situations that can arise during the method and that are not explicitly described here, there can be provision for the method to comprise outputting an error message and/or a prompt to input user feedback and/or selecting a standard setting and/or a predetermined initial state.

The disclosed embodiments also encompass developments of the disclosed central data processing device that have features as have already been described in connection with the developments of the disclosed method. For this reason, the applicable developments of the disclosed method are not described again here.

The disclosure also comprises the combinations of the features of the described embodiments.

The components described for the exemplary embodiments are each individual features of the disclosure that can be considered independently of one another, which each also develop the disclosed embodiments independently of one another and can, therefore, also be considered part of the disclosure individually or in a combination other than the one shown. In addition, the exemplary embodiments described can also be complemented by further features of the embodiments that have already been described.

Elements having the same function are each provided with the same reference signs in the figures.

FIG. 1 shows a schematic representation of a system 10 for setting up a virtual ad hoc network 12 according to an exemplary embodiment. The system 10 firstly comprises a central data processing device 14, for example, a cloud server. This central data processing device 14 can communicate with various transportation vehicles or else infrastructure components and can obtain data therefrom or transmit data thereto.

In the present example, a first transportation vehicle 16 is firstly shown, which is simultaneously also a first network subscriber T1. Additionally, further transportation vehicles 18 are shown as further potential network subscribers T2'. However, these potential network subscribers T2' can additionally or alternatively also be infrastructure components, e.g., traffic lights, level crossings, traffic monitoring installations, monitoring cameras, entrance areas of parking garages, etc. These second transportation vehicles 18 and also the first transportation vehicle 16 transmit data to the central data processing device 14. These data are referred to as first data D1, second data D2 and third data D3 in the present case. These data D1, D2, D3 can generally be sensor data that have been captured by at least one sensor, in particular, surroundings sensor, of a respective transportation vehicle 16, 18, position data of the respective transportation vehicles 16, 18 and also numerous other data, for example, including personal data of the respective drivers or users of the transportation vehicles 16, 18, vehicle parameters of the respective transportation vehicles 16, 18, levels of autonomy or current driving modes of the respective transportation vehicles 16, 18, and so on. If the potential network subscribers T2' are infrastructure components, they are generally static and therefore do not need to transmit their position data to the central data processing device 14 repeatedly. A single provision at the central data processing device 14 is then sufficient. Some of these data D1, D2, D3 can be transmitted to the data processing device 14 repeatedly at regular intervals of time, this being beneficial, in particular, in regard to environment capture, that is to say the sensor data. Other data, such as, for example, personal data, can be provided to the central data processing device 14 once, for example, at the beginning of departure on a journey by a respective transportation vehicle 16, 18 when a user profile or the like is being uploaded. Vehicle parameters such as, for example, current speed of travel can likewise be transmitted to the central data processing device 14 regularly and in an up-to-date manner; other static vehicle parameters, such as, for example, maximum driving performance, vehicle type, model number or the like, can likewise be transmitted to the central data processing device 14 only once.

The central data processing device 14 can then set up a virtual ad hoc network 12 among these transportation vehicles 16, 18. Within this virtual ad hoc network 12, the respective network subscribers T1, T2 can then interchange information among one another, either directly or via the central data processing device 14, to provide the transportation vehicles with appropriate assistance or useful information I, as illustrated for the first transportation vehicle 16 by way of example in the present case. Such information I may thus be a warning or driving advice or a driving instruction or behavior advice, in particular, driving behavior advice, or the like, for example. A function trigger for a function of the transportation vehicle 16, for example, switching on the hazard lights or the like, can also be understood as information I. What information I is fundamentally relevant to the first transportation vehicle 16 in question can be stipulated by the central data processing device 14 on the basis of various criteria. By way of example, the driving situation that the first transportation vehicle 16 is currently in can initially be specified by a situation parameter. Furthermore, an area of relevance that has a temporal and physical correlation can be stipulated for the current position of the transportation vehicle 16. Depending on this situation parameter and the space-time parameter representing this area of relevance, the central data processing device 14 can select the actual second network subscribers T2 from the potential network subscribers T2' and then set up the virtual ad hoc network 12 accordingly. Which of the potential network subscribers T2' need to be selected according to the situation parameter and the space-time parameter can be determined by the central data processing device 14 on the basis of the second data D2 transmitted by the respective potential network subscribers T2'. As already mentioned, these may firstly be current position data of the transportation vehicles, which are used to check whether the transportation vehicles 18 in question are within the stipulated area of relevance. On the basis of the position data, such as, for example, also on the basis of the surroundings data, the central data processing device 14 can also determine whether the respective potential network subscribers T2' are also relevant to the current traffic situation of the first transportation vehicle. Based on that, the second data processing device 14 can thus stipulate the second network subscribers T2. Once the virtual ad hoc network 12 has then been set up, that is to say once the transportation vehicles 16, 18 in question have been grouped into an information interchange group, the first data D1 provided by the second network subscribers T2 can continue to be used by the central data processing device 14 to ascertain therefrom the information I relevant to the first transportation vehicle 16 and to transmit the information to the first transportation vehicle 16. The current traffic situation that the first transportation vehicle 16 is in can be identified on the basis of third data D3 that are transmitted from the first transportation vehicle 16 to the central data processing device 14.

Figure 2:
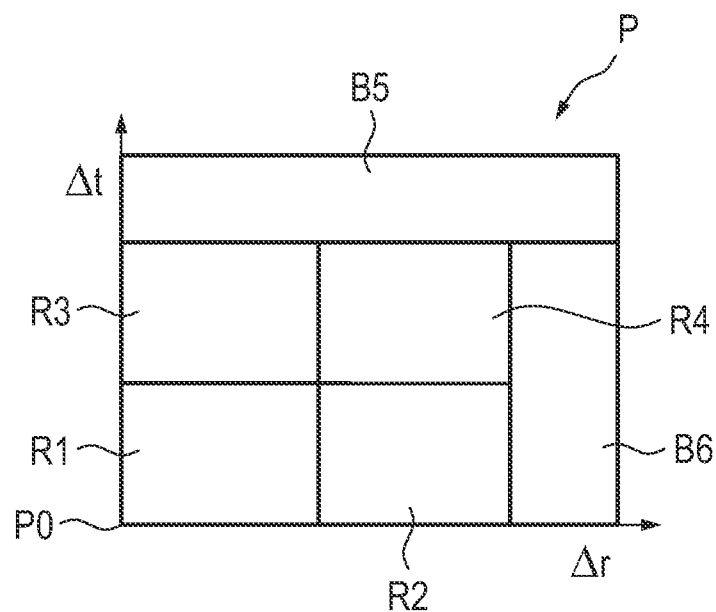
FIG. 2 shows a schematic representation of the areas of relevance having a temporal and physical correlation according to an exemplary embodiment.

FIG. 2 shows a schematic illustration of the space-time parameter P, which defines the area of relevance that has a physical and temporal correlation with the current position of the first transportation vehicle 16. The location divergence $\Delta r$ is plotted on the abscissa shown, and the time divergence $\Delta t$ is plotted on the ordinate, the coordinate origin being determined by the current position P0 of the first transportation vehicle 16. Potential network subscribers T2' situated in the first area of relevance R1 are approximately at the same location as the first transportation vehicle 16 at the same time. They are typically directly affected by a current traffic situation. Potential subscribers T2' situated in the second area of relevance R2 are at a different location at a maximum distance, defined according to a maximum permissible location divergence $\Delta r$, from the position P0 at the same time, whereas the potential network subscribers T2' within the third area of relevance R3 are at the same location at a different time and those within the fourth area of relevance R4 are at a different location at a different time, according to a maximum permissible temporal and physical divergence from the position P0. The areas B5 and B6 are not relevant in this example and therefore also do not count among the areas of relevance, since area B5 is too far away in time and area B6 is too far away in space. The area of relevance in regard to the first transportation vehicle 16 that is defined for a specific traffic situation can be defined only as the first area of relevance R1, for example, or else as a combination of several of these depicted areas of relevance R1, R2, R3, R4, the maximum permissible physical and temporal divergences Δr, Δt likewise being able to be chosen depending on the situation and accordingly being stipulated by the space-time parameter P. If the central data processing device 14 now selects the second network subscribers T2 on the basis of this space-time parameter P, possible second network subscribers T2 are only those that are situated within the area of relevance R1, R2, R3, R4 specified for the current situation according to this defined space-time parameter P. However, there may optionally additionally also be provision for further selection criteria, for example, whether the respective network subscribers T2' are also relevant to the specified traffic situation of the first transportation vehicle 16. This will be described in more detail again below.

Figure 3:
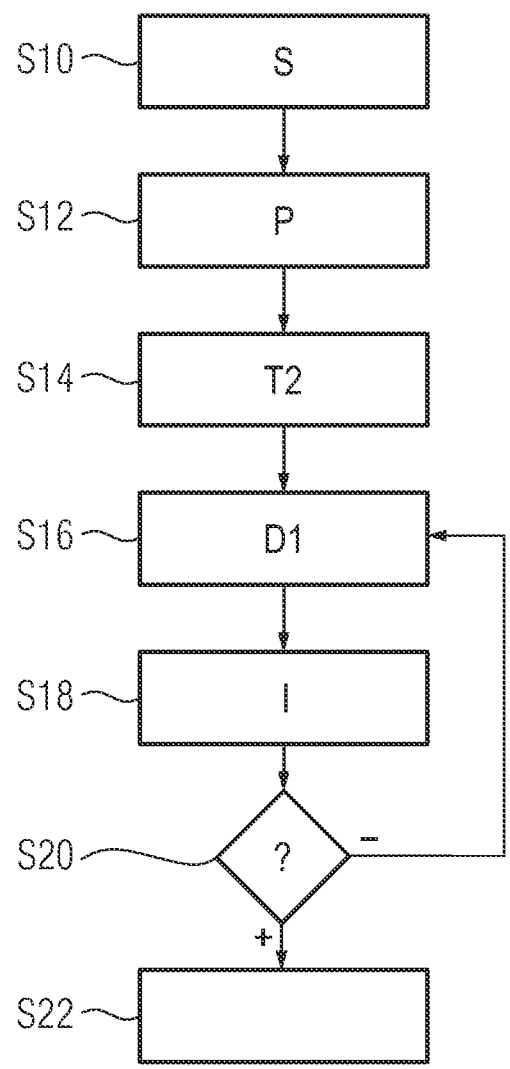
FIG. 3 shows a flowchart to illustrate a method for setting up a virtual ad hoc network according to an exemplary embodiment.

FIG. 3 shows a schematic representation of a flowchart to illustrate a method for setting up a virtual ad hoc network. The method begins in operation at S10, in which the situation facing the first transportation vehicle 16 is initially defined, that is to say the situation parameter S is determined. Additionally, operation at S12 comprises determining the matching parameters, for example, the aforementioned space-time parameter P, and optionally further matching parameters. That is to say that operation at S10 initially comprises determining the situation and operation at S12 comprises determining the matching parameters, for example, according to physical or temporal proximity, possible subscribers, suitability of the subscribers and so on. These matching parameters are then used to determine the subscribers T2 of the virtual ad hoc network 12 that is to be set up. This takes place in operation at S14. It is also conceivable for other transportation vehicles 18 that are currently not yet in situ but whose prediction states that they will be to be able to be considered as subscribers T2. The determined second network subscribers T2 together with the first network subscriber T1, which is provided by the first transportation vehicle 16, then accordingly form the virtual ad hoc network 12.

Within this virtual ad hoc network 12 that has now been set up, a data interchange now takes place among the network subscribers, in particular, directly or indirectly via the central data processing device 14, in operation at S16. Appropriate situation-specific evaluations and actions within the context of applications and use cases can then be carried out. In the course of this, the first data D1 provided by the network subscribers T2 can be used to determine information I, which is then accordingly transmitted to the first transportation vehicle 16, as takes place in operation at S18. In general, this operation at S18 can thus comprise performing an action that is represented by the transmitted information I. This may be the transmission of a warning to the transportation vehicle 16, a driving instruction to the driver, or the like. Transportation vehicles 18, 16, subscribers T1, T2 and so on that are involved thus interchange information that is relevant within the context of the network 12.

Next, operation at S20 can comprise checking whether a termination criterion is met. This may be, for example, that the transportation vehicle 16 is now no longer in the traffic situation. The virtual ad hoc network 12 can then accordingly be removed again in operation at S22. Otherwise, the sequence can return to S16, new data D1 can be obtained and, based on this, new action recommendations or the like can be produced again and transmitted to the transportation vehicle 16 in operation at S18.

All in all, the examples show how the disclosure can provide an ad hoc network for monitoring and warning.

LIST OF REFERENCE SIGNS 10 system
12 virtual ad hoc network
14 central data processing device
16 first transportation vehicle
18 second transportation vehicle
B5 fifth area
B6 sixth area
D1 first data
D2 second data
D3 third data
I information
P0 position
P space-time parameter
R1 first area of relevance
R2 second area of relevance
R3 third area of relevance
R4 fourth area of relevance
S situation parameter
T1 first network subscriber
T2 second network subscriber
T2' potential second network subscriber
Δr location divergence
Δt time divergence
S10 operation
S12 operation
S14 operation
S16 operation
S18 operation
S20 operation
S22 operation

The invention claimed is:

1. A method for setting up a virtual ad hoc network for transmitting at least one piece of information to a first transportation vehicle as a first network subscriber of the virtual ad hoc network, the method comprising:
providing the information based on first data provided by at least one second network subscriber, wherein the at least one second network subscriber is a second transportation vehicle or an infrastructure component;
receiving, by a motor-vehicle-external, central data processing device, second data from multiple potential second network subscribers;
determining, by the motor-vehicle-external, central data processing device, the second network subscribers based on the second data and at least one space time parameter ascertained based on a current position of the first transportation vehicle; and
setting up the virtual ad hoc network with the first transportation vehicle, as the first network subscriber, and the determined second network subscribers, the space-time parameter defining a specific area of relevance that has a predetermined physical and temporal correlation with the current position of the first transportation vehicle,
wherein, as soon as a potential second network subscriber is selected as a second network subscriber, the selected second network subscriber increases a resolution and/ or a capture rate for capture of the first data and/or a provision rate for provision of the first data at the central data processing device or for provision of the information at the first transportation vehicle.

2. The method of claim 1 further comprising the central data processing device determining the second network subscribers based on at least one first situation parameter associated with the first transportation vehicle, which situation parameter characterizes a traffic situation that the first transportation vehicle is in, wherein the situation parameter is selected from multiple defined situation parameters based on third data received from the first transportation vehicle by the data processing device.

3. The method of claim 1, further comprising the central data processing device ascertaining the information based on the first data, and based on the situation parameter, and transmitting the information to the first transportation vehicle.

4. The method of claim 1, wherein the information is transmitted to the first transportation vehicle by one of the second network subscribers.

5. The method of claim 1, wherein the space-time parameter is stipulated based on the at least one situation parameter.

6. The method of claim 1, wherein the space-time parameter defines a maximum permitted physical and temporal distance with reference to the current position of the first transportation vehicle, wherein only those of the potential second network subscribers that are within the maximum permitted physical and temporal distance with reference to the current position of the first transportation vehicle are selected as second network subscribers by the central data processing device, wherein potential second network subscribers that are at a greater distance from the current position of the first transportation vehicle than the maximum permitted physical distance at a current first time and/or are, based on a prediction, have a predeterminately high probability of being, within the maximum permitted physical distance at a second time, which is within the maximum permitted temporal distance at the first time, are selected as second network subscribers.

7. The method of claim 1, wherein the second data comprise a current position of the respective potential second network subscribers, and motion data of the respective potential second network subscribers, based on which a future location of the respective potential second network subscriber is forecast.

8. The method of claim 1, wherein the first and/or second and/or third data comprise:
sensor data captured by at least one sensor of the at least one second network subscriber or of at least one of the potential second network subscribers or of the first transportation vehicle; and/or
personal data of a user of the at least one second network subscriber or of at least one of the potential second network subscribers or of the first transportation vehicle; and/or
vehicle parameters of the at least one second network subscriber or of at least one of the potential second network subscribers or of the first transportation vehicle; and/or
an indication of a level of autonomy or a current driving mode of the at least one second network subscriber or of at least one of the potential second network subscribers or of the first transportation vehicle.

9. The method of claim 1, wherein the information comprises:

a warning and/or information to a driver of the first transportation vehicle; and/or
information to the first transportation vehicle; and/or
a driving instruction or behavior instruction to the driver; and/or
a function trigger for a function of the first transportation vehicle; and/or
surroundings information about objects situated in the surroundings of the first transportation vehicle.

10. A system comprising a central data processing device for setting up a virtual ad hoc network for transmitting at least one piece of information to a first transportation vehicle as a first network subscriber of the virtual ad hoc network, the central data processing device being configured to:
provide the information based on first data provided by at least one second network subscriber, the at least one second network subscriber is a second transportation vehicle or an infrastructure component;
receive second data from multiple potential second network subscribers and take the second data and at least one space-time parameter, ascertained based on a current position of the first transportation vehicle, as a basis for determining the second network subscribers and set up the virtual ad hoc network with the first transportation vehicle, as the first network subscriber, and the determined second network subscribers, the space-time parameter defining a specific area of relevance that has a predetermined physical and temporal correlation with the current position of the first transportation vehicle,
wherein a potential second network subscriber, in response to being selected as a second network subscriber, increases a resolution and/or a capture rate for capture of the first data and/or a provision rate for provision of the first data at the central data processing device or for provision of the information at the first transportation vehicle.

11. The system of claim 10, the central data processing device the second network subscribers based on at least one first situation parameter associated with the first transportation vehicle, which situation parameter characterizes a traffic situation that the first transportation vehicle is in, wherein the situation parameter is selected from multiple defined situation parameters based on third data received from the first transportation vehicle by the data processing device.

12. The system of claim 10, wherein the central data processing device ascertains the information based on the first data, and based on the situation parameter, and transmits the information to the first transportation vehicle.

13. The system of claim 10, wherein the information is transmitted to the first transportation vehicle by one of the second network subscribers.

14. The system of claim 10, wherein the space-time parameter is stipulated based on the at least one situation parameter.

15. The system of claim 10, wherein the space-time parameter defines a maximum permitted physical and temporal distance with reference to the current position of the first transportation vehicle, wherein only those of the potential second network subscribers that are within the maximum permitted physical and temporal distance with reference to the current position of the first transportation vehicle are selected as second network subscribers by the central data processing device, wherein potential second network subscribers that are at a greater distance from the current position of the first transportation vehicle than the maximum permitted physical distance at a current first time and/or are, based on a prediction, have a predeterminately high probability of being, within the maximum permitted physical distance at a second time, which is within the maximum permitted temporal distance at the first time, can be are selected as second network subscribers.

16. The system of claim 10, wherein the second data comprise a current position of the respective potential second network subscribers, and motion data of the respective potential second network subscribers, based on which a future location of the respective potential second network subscriber is forecast.

17. The system of claim 10, wherein the first and/or second and/or third data comprise:
    sensor data captured by at least one sensor of the at least one second network subscriber or of at least one of the potential second network subscribers or of the first transportation vehicle; and/or
    personal data of a user of the at least one second network subscriber or of at least one of the potential second network subscribers or of the first transportation vehicle; and/or
    vehicle parameters of the at least one second network subscriber or of at least one of the potential second network subscribers or of the first transportation vehicle; and/or
    an indication of a level of autonomy or a current driving mode of the at least one second network subscriber or of at least one of the potential second network subscribers or of the first motor transportation vehicle.

18. The system of claim 10, wherein the information comprises:
    a warning and/or information to a driver of the first transportation vehicle; and/or
    information to the first transportation vehicle; and/or
    a driving instruction or behavior instruction to the driver; and/or
    a function trigger for a function of the first transportation vehicle; and/or
    surroundings information about objects situated in the surroundings of the first transportation vehicle.

* * * * *